(12) United States Patent  
Rodriguez-Serrano et al.

(10) Patent No.: US 9,008,429 B2  
(45) Date of Patent: Apr. 14, 2015

(54) LABEL-EMBEDDING FOR TEXT RECOGNITION

(71) Applicant: Xerox Corporation, Norwalk, CT (US)

(72) Inventors: Jose Antonio Rodriguez-Serrano, Grenoble (FR); Florent C. Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 13/757,014

(22) Filed: Feb. 1, 2013

(65) Prior Publication Data

US 2014/0219563 A1    Aug. 7, 2014

(51) Int. Cl.  
*G06K 9/00* (2006.01)  
*G06K 9/18* (2006.01)

(52) U.S. Cl.  
CPC ........................... *G06K 9/18* (2013.01)

(58) Field of Classification Search  
USPC .......... 382/103, 105, 107, 190, 282; 358/538, 358/462  
See application file for complete search history.

(56) References Cited

U.S. PATENT DOCUMENTS

| | | | |
|---|---|---|---|
| 7,680,330 B2* | 3/2010 | Leung | 382/181 |
| 8,171,049 B2* | 5/2012 | Ah-Pine et al. | 707/772 |
| 8,416,999 B2* | 4/2013 | Ogawa | 382/118 |
| 8,447,767 B2* | 5/2013 | Ah-Pine et al. | 707/748 |
| 8,452,108 B2* | 5/2013 | Walch | 382/203 |
| 8,488,904 B2* | 7/2013 | Tsurumi | 382/276 |
| 8,489,585 B2* | 7/2013 | Larlus et al. | 707/723 |
| 8,533,204 B2* | 9/2013 | Serrano et al. | 707/749 |
| 8,582,819 B2* | 11/2013 | Rodriguez Serrano et al. | 382/105 |
| 8,588,470 B2* | 11/2013 | Rodriguez Serrano et al. | 382/105 |
| 8,666,992 B2* | 3/2014 | Serrano et al. | 707/748 |
| 8,774,515 B2* | 7/2014 | Mensink et al. | 382/180 |
| 2003/0021481 A1 | 1/2003 | Kasutani | |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2009/0208118 A1 | 8/2009 | Csurka | |
| 2010/0040285 A1 | 2/2010 | Csurka et al. | |
| 2010/0082615 A1 | 4/2010 | Clinchant et al. | |

(Continued)

OTHER PUBLICATIONS

Rodriguez-Serrano, et al. "Handwritten word-spotting using hidden Markov models and universal vocabularies", *Pattern Recognition* 42.9 (2009): 2106-2116.

(Continued)

*Primary Examiner* — Yosef Kassa  
(74) *Attorney, Agent, or Firm* — Fay Sharpe LLP

(57) ABSTRACT

A system and method for comparing a text image and a character string are provided. The method includes embedding a character string into a vectorial space by extracting a set of features from the character string and generating a character string representation based on the extracted features, such as a spatial pyramid bag of characters (SPBOC) representation. A text image is embedded into a vectorial space by extracting a set of features from the text image and generating a text image representation based on the text image extracted features. A compatibility between the text image representation and the character string representation is computed, which includes computing a function of the text image representation and character string representation.

24 Claims, 8 Drawing Sheets

(56) References Cited

U.S. PATENT DOCUMENTS

| | | |
|---|---|---|
| 2010/0092084 A1 | 4/2010 | Perronnin et al. |
| 2010/0098343 A1 | 4/2010 | Perronnin et al. |
| 2010/0189354 A1 | 7/2010 | de Campos et al. |
| 2010/0191743 A1 | 7/2010 | Perronnin et al. |
| 2010/0226564 A1 | 9/2010 | Marchesotti et al. |
| 2010/0318477 A1 | 12/2010 | Perronnin et al. |
| 2011/0026831 A1 | 2/2011 | Perronnin et al. |
| 2011/0040711 A1 | 2/2011 | Perronnin et al. |
| 2011/0052063 A1 | 3/2011 | McAuley et al. |
| 2011/0072012 A1 | 3/2011 | Ah-Pine et al. |
| 2011/0091105 A1 | 4/2011 | Perronnin |
| 2011/0137898 A1 | 6/2011 | Gordo et al. |
| 2011/0184950 A1 | 7/2011 | Skaff et al. |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2012/0158739 A1 | 6/2012 | Ah-Pine et al. |

OTHER PUBLICATIONS

Anagnostopoulos, et al. "License Plate Recognition From Still Images and Video Sequences: a Survey", IEEE Transactions on Intelligent Transportation Systems, vol. 9, No. 3, Sep. 2008, pp. 377-391.

Perronnin, et al. "Improving the Fisher Kernel for Large-Scale Image Classification", ECCV'10, 2010, pp. 143-156.

Lowe, D. "Distinctive image features from scale-invariant keypoints", IJCV 2004, 60(2), pp. 91-110.

Perronnin, et al. "Fisher kernels on visual vocabularies for image categorization." Computer Vision and Pattern Recognition, CVPR'07, pp. 1-8.

Sanchez, et al. "High-dimensional signature compression for large-scale image classification" CVPR 2011, pp. 1665-1672.

Perronnin, et al. "Large-scale image categorization with explicit data embedding" CVPR 2010, pp. 2297-2304.

U.S. Appl. No. 13/300,124, filed Nov. 18, 2011, Rodriguez-Serrano, et al.

U.S. Appl. No. 13/224,373, filed Sep. 2, 2011, Rodriguez-Serrano, et al.

U.S. Appl. No. 13/458,464, filed Apr. 27, 2012, Rodriguez-Serrano, et al.

U.S. Appl. No. 13/351,038, filed Jan. 16, 2012, Rodriguez-Serrano, et al.

U.S. Appl. No. 13/527,228, filed Jun. 19, 2012, Skaff, et al.

Schölkopf, et al. "Non-linear component analysis as a kernel eigenvalue problem" Neural Computation, Jul. 1, 1998, vol. 10, No. 5, pp. 1299-1319.

Joachims, T. "Optimizing Search Engines using Clickthrough Data", *Proc. of the 8th ACM SIGKDD Intl. Conf. on Knowledge discovery and data mining*, 2002, pp. 133-142.

Lazebnik, et al. "Beyond Bags of Features: Spatial Pyramid Matching for Recognition Natural Scene Categories", CVPR, 2006, vol. 2, pp. 2169-2178.

Lecun, et al. "Efficient backprop." *Neural networks: Tricks of the trade* (1998): 546-546.

Nowozin, et al. "Structured Learning and prediction in computer vision" Foundations and Trends in Computer Graphics and Vision, 2010, vol. 6, Nos. 3-4, pp. 185-365.

Plamondon, et al. "On-line and off-line handwriting recognition: a comprehensive survey" IEEE Trans. Pattern Anal. Mach. Intell., 2002, 22(1):63-84.

Tsochantaridis, et al. "Large margin method for structured and interdependent output variables", JMLR, 2005, pp. 1453-1484.

Weston, et al. "WSABIE: Scaling up to large vocabulary image annotation" IJCAI, 2011, pp. 2764-2770.

Williams, et al. "Using the Nystrom method to speed up kernel machines" NIPS 2001, pp. 682-688.

\* cited by examiner

LABEL-EMBEDDING FOR TEXT RECOGNITION

BACKGROUND

The exemplary embodiment relates to text recognition in images. It finds particular application in connection with recognizing license plates and will be described with particular reference thereto. However, it is to be appreciated that it is applicable to a wide range of recognition problems.

Text recognition in images involves both recognizing that a portion of the image is an image of text and also recognizing the character sequence which constitutes the text. There are many instances where it is desirable to recognize text in images, for example, recognition of license plate numbers in images of vehicles, recognition of street names on images of street scenes, and the like. It may also be desirable to recognize different types of text (e.g., typed text vs. handwritten text) and to recognize different types of images (e.g., natural images vs. document images).

Recognition of license plate information assists in vehicle recognition, since, in general, the license plate is a unique identifier for the vehicle on which it is mounted. In the past, this problem has been traditionally addressed by applying Optical Character Recognition (OCR) on the license plate image. See, for example, Anagnostopoulos, et al., "License plate recognition from still images and video sequences: A survey," IEEE Trans. on Intelligent Transportation Systems, vol. 9, No. 3, pp. 377-391, 2008, hereinafter "Anagnostopoulos"). However, OCR recognition can be computationally expensive and accuracy diminishes when the visibility at the time of capturing the image is poor.

A recent solution has been to address recognition as an image matching problem, as disclosed, for example, in copending U.S. application Ser. No. 13/300,124. Given an image of a license plate (the query), the license plate number of the closest matching images in a large database are retrieved. The images to be compared are each represented by an image signature, which is a statistical representation of an image, derived from low-level features extracted from the image. As image signatures, Fisher Vectors can be used. See, for example. Perronnin, et al., "Improving the Fisher kernel for large-scale image classification," in ECCV, 2010.

The signature comparison method assumes that at least one example of the query is already present in the database. While this is often not an issue in some applications (for example, in the context of a parking application where an image taken at the exit is being matched to images taken at the entry), there are many instances where such a database is not available or is incomplete. One way that this could be addressed is by generating artificial license plates. For example, U.S. application Ser. No. 13/224,373 discloses a method for creation of virtual license plates by combining similar license plates. U.S. application Ser. Nos. 13/300,124 and 13/458,464 disclose methods for synthesizing license plate images.

The first of these methods is focused on retrieval and yields good results in terms of accuracy when the goal is to ensure that the license plate will likely be among the most similar retrieved images (e.g., among the top 20). This is generally sufficient for manually assisted search applications, but can pose problems for recognition, where usually a high top-1 accuracy is desired, i.e., it is desired to identify a single match with a high degree of accuracy, where a match is actually present. The second method can generate photo-realistic images of license plates from a given sequence of characters. However, it relies on a certain prior knowledge of the domain of application (e.g., license plate background, font, and the like). Additionally, multiple images are typically generated with different transformations to account for a set of representative plate distortions, which can be computationally expensive.

There remains a need for a system and method for recognizing text in images which is both sufficiently accurate for the particular application and is computationally efficient.

INCORPORATION BY REFERENCE

The following references, the disclosures of which are incorporated herein by reference in their entireties, are mentioned:

U.S. Pub. No. 20100226564, entitled FRAMEWORK FOR IMAGE THUMBNAILING BASED ON VISUAL SIMILARITY, by Luca Marchesotti, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. application Ser. No. 13/224,373, filed on Sep. 2, 2011, entitled TEXT-BASED SEARCHING OF IMAGE DATA, by José Antonio Rodriguez Serrano, et al.

U.S. application Ser. No. 13/300,124, filed on Nov. 18, 2011, entitled METHODS AND SYSTEMS FOR IMPROVED LICENSE PLATE SIGNATURE MATCHING BY SIMILARITY LEARNING ON SYNTHETIC IMAGES, by José Antonio Rodriguez Serrano, et al.

U.S. application Ser. No. 13/458,464, filed Apr. 27, 2012, ENTITLED METHODS AND SYSTEMS FOR IMPROVING YIELD IN WANTED VEHICLE SEARCHES, by José Antonio Rodriguez Serrano, et al.

U.S. application Ser. No. 13/351,038, filed on Jan. 16, 2012, entitled IMAGE SEGMENTATION BASED ON APPROXIMATION OF SEGMENTATION SIMILARITY, by José Antonio Rodriguez Serrano.

U.S. application Ser. No. 13/527,228, filed Jun. 19, 2012, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.

BRIEF DESCRIPTION

In accordance with one aspect of the exemplary embodiment, a method for comparing a text image and a character string includes embedding a character string into a vectorial space. This includes extracting a set of features from the character string and generating a character string representation based on the extracted features. A text image is embedded into a vectorial space. This includes extracting a set of features from the text image and generating a text image representation based on the text image extracted features. A compatibility between the text image representation and the character string representation is computed. This includes computing a function of the text image representation and character string representation. At least one of the embedding and the computing of the compatibility may be performed with a processor.

In another aspect of the exemplary embodiment, a system for comparing a text image and a character string includes a text string representation generator for generating a character string representation based on features extracted from a character string, the character string consisting of a sequence of characters, the text string representation comprising a spatial pyramid bag of characters representation. A text image representation generator generates a text image representation based on features extracted from a text image. A comparator computes a compatibility between the text image representation and the character string representation. An output component outputs information based on the computed compatibility between at least one character string representation and at least one text image representation. A processor implements the text string representation generator, text image representation generator; comparator, and output component.

In another aspect, a method for comparing a text image and a character string includes, for at least one character string that includes a sequence of characters, extracting a set of features from the character string. This includes partitioning the character string to form a spatial pyramid of regions and for each region, generating a representation of the region which includes counting occurrences of each of a finite set of characters in the region. A character string representation is generated, based on the region representations. A set of features is extracted from the text image and a text image representation is generated, based on the extracted features. A compatibility between the text image representation and the character string representation is computed. This includes embedding at least one of the character string representation and the text image representation with a matrix of learned parameters. The compatibility is a function of the at least one embedded representation. At least one of the embedding and the computing of the compatibility may be performed with a processor.

DETAILED DESCRIPTION

Aspects of the exemplary embodiment relate to a system and method for recognizing text in images which relies on a representation of a sequence of characters, such as a license plate number. This representation is referred to herein as a Spatial Pyramid Bag-Of-Characters (SPBOC) in which the characters are drawn from a predefined vocabulary (letters of the alphabet and numbers in the case of license plate numbers). The representation is derived from segmenting a character string into progressively smaller segments, in a pyramidal fashion, each segment being associated with a respective sub-representation which is a function of the characters in the respective segment. The sub-representations are aggregated to form a representation of the sequence as a whole.

Figure 1:
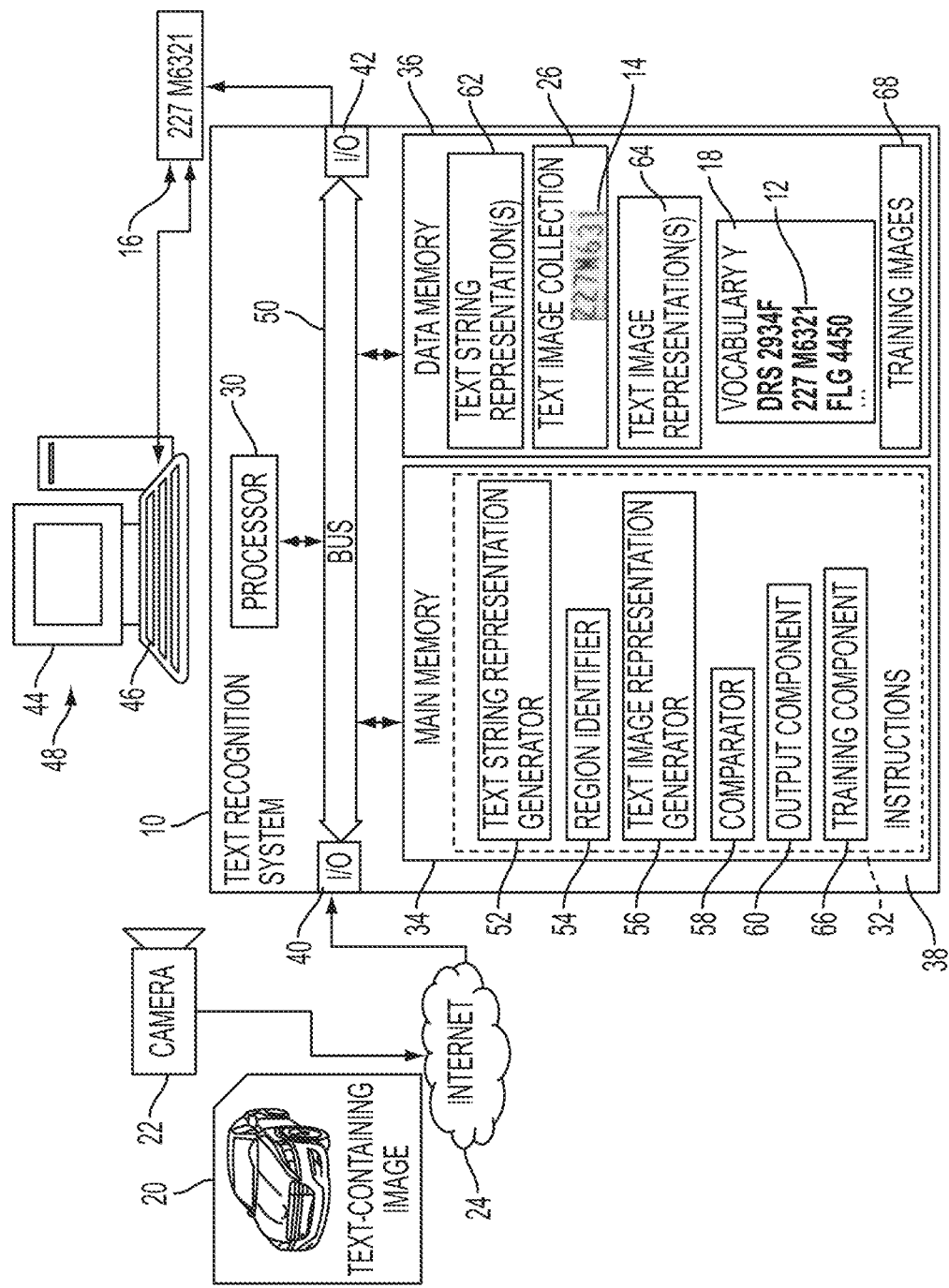
FIG. 1 is a functional block diagram of a system for recognizing text in images.

With reference to FIG. 1, a functional block diagram of a computer-implemented text recognition system 10 is shown.

The computer system 10 is configured for computing a measure of similarity between a character string 12 such as a license plate number, and a text image 14, such as an image of a license plate, by generating representations of the respective objects in a space which allows a meaningful measure of similarity to be computed, without the need for OCR or other character recognition processing of the text image, and to output information 16 based thereon. The license plate number (or registration identifier) is a numeric or alphanumeric code that uniquely identifies the vehicle on which it is mounted within the issuing region's database. As will be appreciated, the license plate number and image of a license plate are exemplary only and are used to illustrate the exemplary embodiment in which a text image is compared to a character string of characters drawn from a predefined, finite vocabulary.

Various forms of information 16 may be output based on the computed similarity measure which may depend on the use of the system 10. In one embodiment, a character string 16 that is predicted to correspond to the text image can be output by the system when the similarity measure meets a threshold value. In another embodiment, the most similar character string 16 may be output. In yet another embodiment, the information output may include a notification that the text image does not correspond to one of a limited vocabulary 18 of the character strings 12, for example, if the similarity measure does not meet a threshold value for any of the character strings in the vocabulary 18.

The exemplary system 10 may be configured for receiving as input one or more images 20, which in the illustrated embodiment are images of vehicles acquired by an image capture device 22, such as a camera. In other embodiments, the system 10 may receive as input preprocessed text images 14, formed by localizing the text content in the image 20 and cropping the extraneous content out of the image. The system 10 may be communicatively connected with the image capture device 22 or with one or more intermediate computer-implemented image processing systems (not shown) via a wired or wireless connection 24, such as a local area network or a wide area network, such as the internet. In some embodiments, a collection 26 comprising a number of text containing images 14, such as at least two or at least five or at least ten or a hundred text images 14, may be acquired and stored in memory of the system or in remote memory that is accessible to the system.

In the exemplary embodiment, the system is configured for receiving (or internally generating) the vocabulary 18 of the character strings 12, which may each be referred to herein as a label. The character strings 12 each comprise a sequence of characters drawn from a finite set of characters. Each character can be represented in the form of a binary code, which represents each character of the finite character set as a unique sequence of bits, such as a seven or more bit binary code, depending on the number of characters in the finite set. ASCII codes may be used although codes specifically designed for the system may alternatively be employed. In the license plate example, the vocabulary 18 of predefined character strings may include all possible worldwide or US license plate numbers, US license numbers currently in use, or a more limited set, such as only the license plate numbers of vehicles authorized to park in a designated area, or license plate numbers of stolen vehicles.

Figure 2:
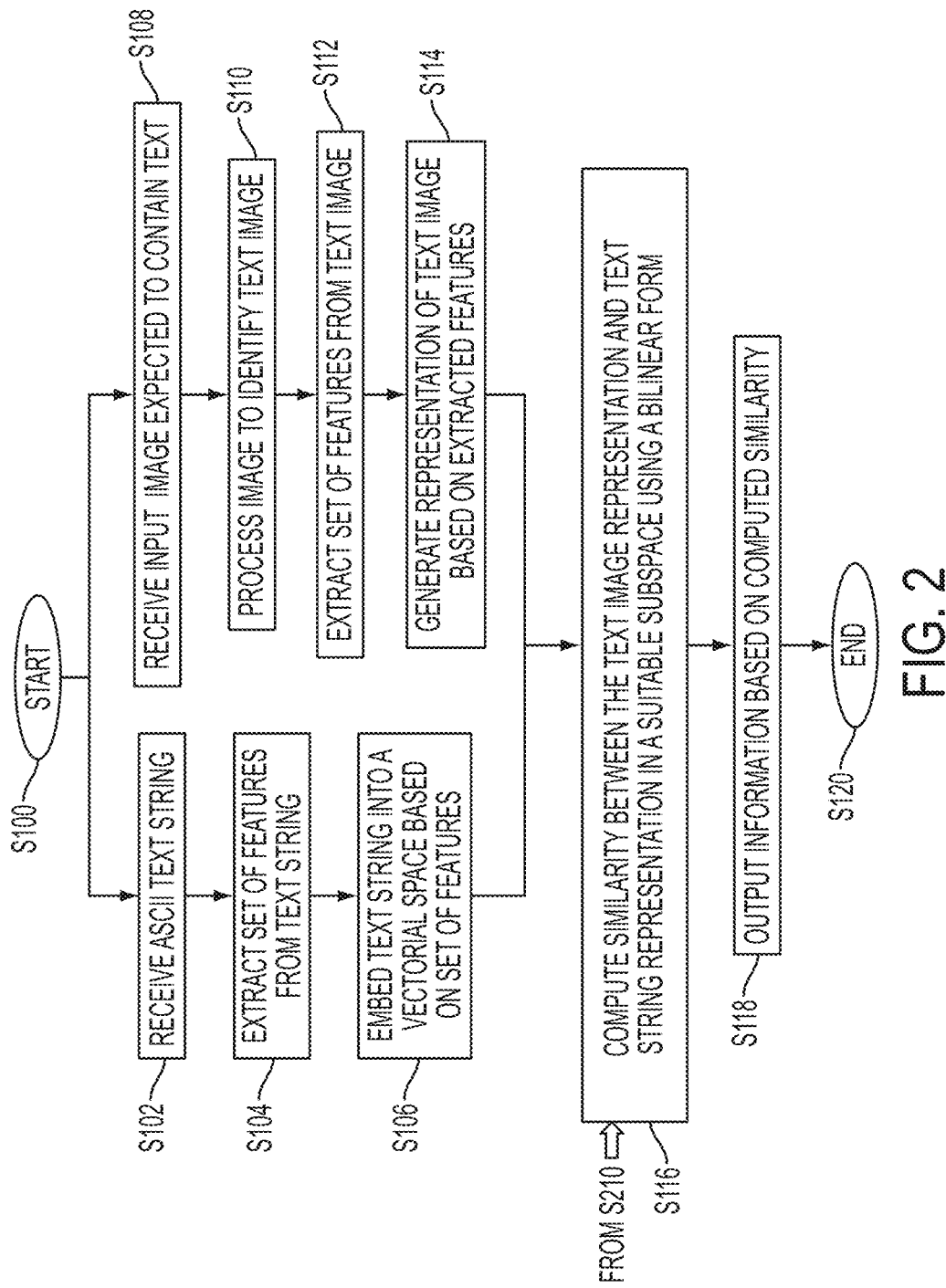
FIG. 2 is a flow chart of a method for recognizing text in images.

The illustrated computer system 10 includes a processor 30 which executes instructions 32 stored in main memory 34 for performing the method outlined in FIG. 2. The processor 30 may also control the overall operation of the computer system 10 by execution of processing instructions stored in memory 34. Data may be stored in data memory 36 that is integral with or separate from memory 34 and which may be resident on the same computing device 38, as shown, or on a remote computing device.

Computer system 10 also includes a network interface 40 and a user input output interface 42. The input/output (I/O) interface 42 may communicate with one or more of a display device 44, such as a computer monitor or other screen, for displaying information to users, and a user input device 46, such as a keyboard or touch or writable screen, and/or a cursor control device, such as mouse, trackball, or the like, for inputting text and for communicating user input information and command selections to the processor 30. Display device 44 and user input device 46 may be directly linked to the computer 38, or may form parts of a client computing device 48 which is linked to the system by a wired or wireless connection analogous to link 24. The various components of the computer 38 may be all communicatively connected by a bus 50. The computer may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 34, 36 may represent any type of non-transitory computer readable medium such as random access memory (RAM), read only memory (ROM), magnetic disk or tape, optical disk, flash memory, or holographic memory. In one embodiment, the memory 34, 36 comprises a combination of random access memory and read only memory. In some embodiments, the processor 30 and memory 34 and/or 36 may be combined in a single chip. The network interface 40, 42 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 30 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer 38, executes instructions stored in memory 34 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Images 14, 20 may be received by the text recognition system 10 in any convenient file format, such as JPEG, GIF, JBIG, BMP, TIFF, or the like or other common file format used for images and which may optionally be converted to another suitable format prior to processing. Input images may be stored in data memory 36 during processing. Images 14, 20 can be input from any suitable image source, such as a workstation, database, memory storage device, such as a disk, image capture device, or the like. In general, each input digital image includes image data for an array of pixels forming the image. The images may be individual images, such as photographs, video images, or combined images, or the like. In general each image 14, 20 may be a digital photographs expected to include a text region in which characters of a text string are visible as a set of pixels of the image. The image data of the image may include colorant values, such as grayscale values, for each of a set of color separations, such as $L^*a^*b^*$ or RGB, or be expressed in another other color space in which different colors can be represented. In general, "grayscale" refers to the optical density value of any single color channel, however expressed ($L^*a^*b^*$, RGB, YCbCr, etc.). The exemplary embodiment may be used for black and white (monochrome) images or for images which have been converted to monochrome for convenient processing.

The instructions 38 may include a text string representation generator 52, a region identifier component 54, a text image representation generator 56, a comparator 58, and an information output component 60. These components are best understood with respect to the method described with reference to FIG. 2. Briefly, the text string representation generator 52 operates on the character strings 12 in vocabulary 14 to generate a representation 62 for each in Euclidian space, or at least for a selected subset thereof, using the SPBOC technique, described in further detail below. The region identifier component 54 receives an input image 20, which is expected to contain an image segment containing a text string, and identifies an image segment 14, likely containing a text string, which is stored in memory. The region identifier component 54 is optional if the image segments 14 have been generated elsewhere. The text image representation generator 56 generates a vectorial representation 64 of the image 14, again using the SPBOC technique. The comparator 56 compares the two representations, optionally after embedding one or both of them in a common subspace, to generate a measure of comparability, such as a similarity score. The information output component 60 outputs information based thereon, such as whether the image segment 14 and the vocabulary text string 12 are a match, the most likely match from the vocabulary 18, or in a reverse matching problem given a single vocabulary text string 12, outputs the most likely match in a database containing a collection of the image segments, or information based thereon. The system 10 may include a training component 66 for learning parameters of an embedding function used by the comparator 56. Alternatively, the embedding function may be learned by a separate system.

FIG. 2 illustrates a method for text recognition which can be performed with the system of FIG. 1. The method begins at S100.

At S102 at least one character string 12 (or "label") for which a representation is to be generated is received and stored in memory 36.

At S104, for each character string 12, a representation is generated by the text string representation generator 52, and stored in memory. There may be a single text string or a plurality of text strings in the vocabulary 18, depending on the specific application. The character strings 12 that are in the vocabulary 18 may vary over time in some embodiments.

At S106, for each character string 12 in the vocabulary 14, features are extracted using the SPBOC. In particular, the character string is recursively partitioned into regions and for each region, features are extracted based on the characters wholly or partially present in the region.

At S108, a vectorial representation 62 is generated for the character string 12, based on the features extracted at S106, and stored in memory 36.

At S110, at least one input image 20 which is expected to contain an image segment containing a text string is received and stored in memory 36. The method may take as input a single image 20, or a collection 26 of images to be processed. The images 14 in the collection 26 may vary over time in some embodiments.

Optionally, at S112, for each image 20 an image segment 14 (region of interest), likely containing a text string, is identified within the input image 20, by the region identifier component 54, and stored in memory.

At S114, features are extracted from the image segment 14.

At S116, a vectorial representation 64 of the image segment 14 is generated, based on the features extracted at S114, by the text image representation generator 56.

At S116, the two multidimensional representations 62, 64 are compared by the comparator 58 to generate a comparison measure, such as a similarity score. The comparison may be made in a common subspace by embedding one or both of the two representations in the subspace. In one embodiment, the parameters of an embedding function, such as elements of a matrix, may have been learned using actual labels of labeled test images to provide a comparison measure that is more likely to yield a more accurate measure of similarity for the label and image, as described with reference to FIG. 3. The embedding and comparison of the embedded representations can be performed in a single step with a single embedding/comparison function which takes as input the two representations 62, 64, as described below. In other embodiments, the embedding and comparison of the embedded representations can be performed as separate steps. The comparison can include determining whether the two representations exceed a threshold on similarity from which they are determined to be a match or a potential match.

At S118, information based on the comparison is output by the output component 60. In the case where the method is used for recognition, e.g., to find a match for a given text image, such as a license plate image, in a database 18 of text strings 12, such as license plate numbers, the information output may be a closest matching one (or more) of the license plate numbers from the database, if the comparison score is above a predetermined threshold or information based thereon, such as information about the owner of the vehicle. In the case where the method is used for retrieval, e.g., to find a match for a given input text string, such as a license plate number, in a database of text images, such as license plate images, the information output may be a closest matching one (or more) of the license plate images from the database, if the comparison score is above a predetermined threshold, or information based thereon, such as information about the location of the vehicle at a given time, for example the location of the camera which captured the license plate image, or that there is a vehicle in a location, such as a parking garage with a license plate which matches the text string.

The method ends at S120. The method can return to one of the earlier stages when a new image or new character string is received.

Figure 3:
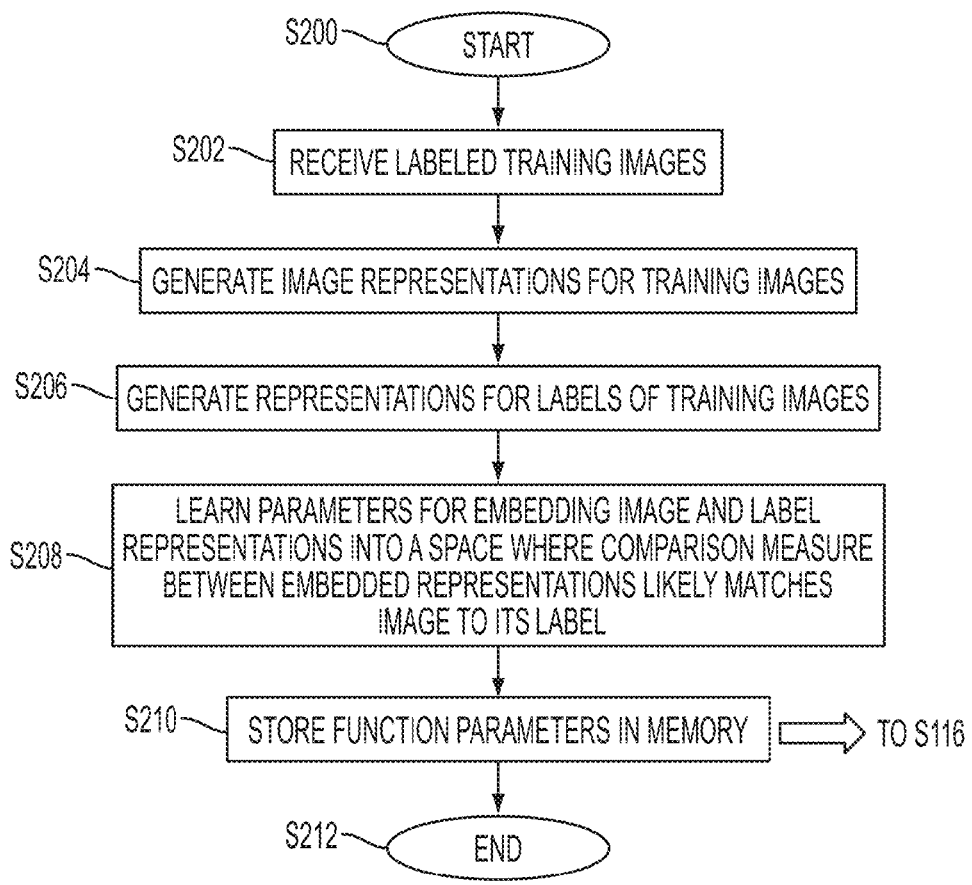
FIG. 3 is a flow chart illustrating computing parameters of a function for comparing image and text representations for use in the system of FIG. 1.

The method of FIG. 2 assumes that a comparison function has been learned for comparing the two representations. FIG. 3 illustrates an example method for learning the comparison function, which is described more fully below. The method may be implemented by the training component 66 of the system 10, which calls on other components previously described, or may be performed on a separate computing device.

The method begins at S200.

At S202 a set 68 of training images, similar to images 14, is received. Each training image has a manually assigned label which is the character string that a human reviewer has recognized in the image, such as the sequence of letters and numbers forming a license plate number. The character string (label) consists of a sequence of characters selected from the finite set of characters.

At S204, an image representation is generated for each training image with image representation generator 56, in the same manner as for the test image 14, e.g., using Fisher vectors, as described for S104, S106.

At S206, a representation is generated for each label, with text string representation generator 52, as described for S112, S114.

At S208 embedding parameters, such as weights of a matrix, are learned for embedding one or both of the image and text string representations in a space in which the image representation is more likely to be most similar to its corresponding label representation than to other label representations, or vice versa. This ensures that matching image/label pairs rank higher than non-matching pairs. The matrix of weights w can be learned using stochastic gradient descent, or other learning methods. At S210, the learned parameters are stored in memory, such as memory 36. The method ends at S212 and/or may proceed to S116 of FIG. 2.

The method illustrated in FIG. 2 and/or FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2 and/or 3, can be used to implement the method.

As will be appreciated, the steps of the method(s) need not all proceed in the order illustrated and fewer, more, or different steps may be performed.

Further details of the system and method will now be described.

The exemplary method can use a principled solution to the problem of text recognition in images which is based on structured output learning. See, for example, I. Tsochantaridis, et al., "Large margin methods for structured and interdependent output variables," JMLR, 2005, for a discussion of this approach.

Briefly, candidate text labels 12 are embedded in a Euclidean space by computing an explicit representation of the label: a spatial pyramid bag-of-characters (SPBOC) (S104, S106). In the comparison stage (S116), a ranking objective function is optimized, which ensures that matching feature/label pairs rank higher than non-matching pairs. Given a test image 14, text recognition can be performed by searching for the best ranked label among a set of candidate labels. In one embodiment, the objective function performs an embedding of the image representations into the space of the label representations. This allows expressing the similarity of an image and a label as a dot product between the image and label representations.

Comparing a Character String with an Image Representation

For recognition purposes, the problem is to recognize words in a given vocabulary Y. This vocabulary may be the natural vocabulary of a natural language such as English. In the license plate recognition context, this could be the set of valid license plate numbers to be recognized. It is also assumed that access is provided to images 14 of the words to be recognized. In the example embodiment, each image 14 contains a sequence of characters, such as single word, as obtained, for example, after the segmentation process (S110). In the case of license plates, for example, segmentation processes have been developed which identify the most likely region of an image 20 where the license plate is to be found by comparing the image 20 with images which have been previously segmented in this way. See, for example, above-mentioned U.S. application Ser. No. 13/351,038. Other segmentation algorithms suited to license plate images are described in Anagnostopoulos, discussed above. In other embodiments, a manual segmentation may be performed in which a human reviewer identifies the region of an image in which the license plate is located.

Let X be the space of word images. Then, given an image 14, the aim is to predict the likely sequence of characters that it contains. In the exemplary embodiment, a structured prediction model referred to herein as a compatibility function, is learned which is applied by the comparator 58. The function can be learned prior to input of an image 14, in a preliminary step, as follows.

Structured Prediction

As discussed briefly with reference to FIG. 3, the goal of prediction is to learn a function of the general form:

$$f:X \to Y \quad (1)$$

i.e., a function which converts the space X of word images to the vocabulary Y. In structured prediction, this may be performed as follows. A function: $F:X \times Y \to \mathbb{R}$, is introduced where $\mathbb{R}$ is the set of real numbers. Then, a function can be defined for an image x as follows:

$$f(x; w) = \underset{y \in Y}{\mathrm{argmax}} F(x, y; w) \quad (2)$$

where w denotes a parameter vector of the function F, and y represents one of the labels in the vocabulary Y, i.e., given an image x, the aim is to find a label y which maximizes the function F over the set Y of all possible labels.

F(x,y;w) can be understood as a compatibility function which measures how compatible the pair (x,y) is, given the parameters w.

It can be assumed that F is linear in some combined feature embedding ψ(x,y) of image samples and labels, i.e.:

$$F(x,y;w) = \langle w, \psi(x,y) \rangle \quad (3)$$

where ⟨.,.⟩ denotes the dot-product operator. The joint embedding ψ can be written as the tensor product between an embedding of the images: $\theta = X \to \mathbb{R}^D$ and an embedding of the labels $\phi = Y \to \mathbb{R}^E$, where D and E represent the dimensionality of the respective representations and θ represents the features of an image, i.e.:

$$\psi(x,y) = \theta(x) \otimes \phi(y) \quad (4)$$

where ⊗ represents the tensor product, θ(x) represents the feature vector (representation) of a given image x, φ(y) represents the feature vector representing a given label (character string) y and ψ(x,y): $R^D \times R^E \to R^{DE}$. In such a case, the embedding parameter w is a DE-dimensional vector, which can be reshaped into a D×E matrix W. Consequently, a compatibility F(x,y;w) can be rewritten as a compatibility function in a bilinear form:

$$F(x,y;W) = \theta(x)^T W \phi(y) \quad (5)$$

where T represents the transpose operator. Thus, given a representation of an image and a representation of a character string, a compatibility F between the image and the label is computed by multiplying the feature vectors representing the image and label features when embedded into a new space using the projection matrix W. W essentially provides a weight for each pair of features, one from the image representation and one from the character string representation. As will be appreciated, in Eqn. 5 the positions of the two representations θ(x) and φ(y) may be swapped.

It may be noted that if the number of elements D and E in the two vectors are large, then the matrix W may be large, in which case it may be advantageous to consider a low-rank decomposition of W as a product of two matrices. In this case an approximation $W \approx U^T V$ is used, with $\in \mathbb{R}^{R \times D}$, $\mathbb{R}^{R \times E}$, where R<D and R<E. In such a case:

$$F(x,y;W) = (U\theta(x))^T (V\phi(y)). \quad (6)$$

Thus, F(x,y;W) is a dot-product in an R-dimensional space. In what follows, only the full-rank case (Eqn. 5) is considered with the understanding that a decomposition as in Eqn. 6 is readily performed. In the next two sections, the choice of functions θ and φ for embedding each image and each label, respectively, is discussed.

Image Embedding (S112, S114)

An image representation or "signature" 64 is generated from each cropped image 14 based on low level features extracted from the image, such as color or gradient features, and analogously for the training images. The function θ: $X \to \mathbb{R}^D$ is a feature extraction function which takes as input an image 14 in a space X (an array of pixel values) and outputs a D-dimensional vectorial image signature. While any feature extraction method can be used, as discussed below, in the exemplary embodiment, a bag-of-patches framework is used. In this method, low-level features are extracted from local patches at multiple scales and statistics computed for each patch descriptor. These patch statistics are then aggregated at an image level. The patch statistics can be computed, for example, using the Fisher Vector (FV) principle: it is assumed that a generative model of patches exists (such as a Gaussian Mixture Model (GMM)) and the gradient of the log-likelihood of the descriptor is measured with respect to the parameters of the model. To include spatial information about the word image into the signature, the image can be partitioned into regions, the per-patch statistics aggregated at a region level, and then the region-level signatures concatenated to form the image signature. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

While particular reference is made to Fisher vectors, other methods for computing an image signature are also contemplated The signature 64 generated by representation generator 56 for each image 14 can be any suitable high level statistical representation of the respective image, such as a multidimensional vector generated based on features extracted from the image. Fisher Kernel representations and Bag-of-Visual-Word representations are exemplary of suitable high-level statistical representations which can be used herein as an image signature. The exemplary image signatures are of a fixed dimensionality, i.e., each image signature has the same number of elements. In general, each image signature 64 has at least 30, or at least 60, or at least 100, or at least 500 dimensions, and up to 1000 or more dimensions, each dimension having a respective feature value, which may be reduced to fewer dimensions.

In one embodiment, the representation generator 56 includes a patch extractor, which extracts and analyzes low level visual features of patches of the image 14, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50 patches are extracted from each image. Each patch may comprise at least 40 or at least 100 pixels, and up to 1,000,000 pixels or more.

The extracted low level features (e.g., in the form of a local descriptor, such as a vector or histogram) from each patch can be concatenated and optionally reduced in dimensionality, to form a feature vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, or features of characters, such as straight lines, curved lines, etc.), characteristic background (e.g., starlit sky, blue sky, grass field, snow, beach, white surface, etc.), or the like. Given an image 14 to be assigned a signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

The signatures may be indexed or compressed using conventional techniques (locality sensitive hashing (LSH), product quantization, principal component analysis (PCA), etc.) to speed up the process.

In the case of a Fisher vector, this can be computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., F. Perronnin, et al., "Improving the Fisher kernel for large-scale image classification," in ECCV, Part IV, pages 143-156 (2010), and in Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any license plate image if the range of interest is license plates).

Other exemplary methods for computing image signatures are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

In an exemplary embodiment, the low-level features are gradient features, such as SIFT descriptors, one per patch. The dimensionality of these descriptors is reduced from 128 to 32 dimensions. A visual vocabulary of 64 Gaussians is used in the GMM and only the gradient with respect to the mean parameters is considered. The word image 14 is split into 4 regions (4 vertical stripes). This results in a 32×64×4=8,192-dimensional FV signature.

While the exemplary method considers license plate or other images in which the sequence of characters forms a single row, it is also the case that character strings may be split over two or more rows. In One embodiment, such an image may be segmented into rows and the rows concatenated to firm a single row image. In other embodiments, an image is segmented into words and each word is considered as a separate sequence of characters.

Text Embedding (S104-S106)

The function $\Phi$ is used to embed character strings, such as words in a binary code e.g., ASCII words (or UTF-8), into a Euclidean space. This embedding is intended to respect some similarity between words, such that two similar words are close to each other in the Euclidean space after embedding. There are several ways to measure the similarity between two words (lexical vs. semantic) and some of them are less well suited to the case of text recognition. In the present case, it is appropriate to preserve the lexical similarity, this means that words which contain the same letters in the same order should be closer to each other after the embedding. For example, a pair of words such as "mommy" and "mummy" should be closer to each other than a pair of words such as "mummy" and "mother". One suitable embedding technique which preserves the lexical similarity will now be described.

It is assumed that the words in the images 14 are composed of characters in a finite set of characters. For example, for a license plate recognition method, the set of possible characters L is the set of possible letters and figures in the alphabet $L=\{A,B,C,D,\ldots Z\}\cup\{0,1,2,3,4,5,6,7,8,9,0\}$. In this embodiment, $L=26+10=36$ characters. As will be appreciated, other characters may be considered depending on the application or the target language. Special characters may also be considered such as a space amounting to at least a predefined gap between two characters.

The words could simply be embedded into an L-dimensional space by counting the number of occurrences of each character. Such a representation would correspond to a bag-of-characters (BOC). Such a histogram representation could then subsequently normalized, using, for example the $l_1$ norm or the $l_2$ norm (or any $l_p$ normalization technique). Other normalizations can also be applied, such as a square-rooting which is beneficial on histogram representations when measures such as the dot-product or Euclidean distance are subsequently used (see, for example, F. Perronnin, J. Sánchez, and Y. Liu, "Large-scale image categorization with explicit data embedding," in CVPR, 2010). As a simplified example, assume that the set of characters includes only 5 characters, e.g., $L=\{A,B,C,D,E\}$. Assume also that the following 5-character word is being considered: ABCDE. In such a case, each of the five possible letters occurs only once, so without normalization, the histogram of counts for each of the possible characters would be [1,1,1,1,1]. Assuming that an $l_1$ normalization of the histogram is performed (i.e., all elements sum to 1), then the BOC representation, which ignores character order, is: [1/5,1/5,1/5,1/5,1/5].

A disadvantage of the BOC representation described above is that it does not take into account the order of the letters. Therefore, the sequence EDCBA would have the same BOC representation as ABODE, although the letters are in reverse order.

Figure 4:
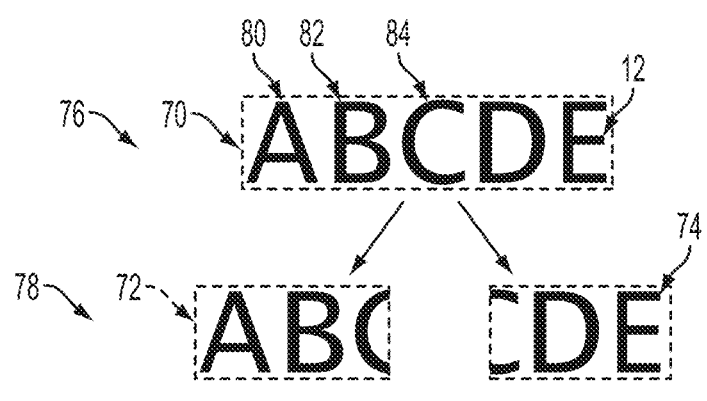
FIG. 4 illustrates generating regions of a character string in the methods of FIGS. 2 and 3.

To include information about the order of characters, in the exemplary embodiment, a spatial pyramid representation (SPBOC) may be employed, rather than a simple BOC. In this method, a word (such as the letters ABCDE in FIG. 4 is partitioned into a plurality of regions 70, 72, 74 (the entire character string can be considered one region 72). In one embodiment, this results in a sequence of spatial levels 76, 78, etc., each level (apart from the first) being formed by partitioning the region(s) in the previous (higher) level. The partitioning is performed perpendicular to the direction of the text. Thus, in at least the second level 78, each region 72, 74 includes at least one full character. Each character 80, 82, 84, etc. in the character string may be assumed to have a character width, which can be the same for each character, if the same is expected to be approximately true for the characters in the word images. In this embodiment, this results in a five character string being split equally into two 2½ character strings at the second level and into four 1¼ character strings at the third level. In other embodiments, different characters may be assigned different widths.

The number of characters 70, 72, 74 in each region is then counted. If a character falls into multiple regions, then the assignment of this letter to this region is proportional to the percentage of the character which falls into the region. For example the letter C is split equally between regions 72 and 74 and thus each of regions 72 and 74 is assigned ½ C. A word 12 (or other character string) may be split recursively into two, where different partitions correspond to different levels. At each level, one BOC is computed for each region. The BOC may be a vector having an element for each character in the set of characters each element having a value which is based on the number of occurrences of that character in the respective region. For example, the counts are normalized so that the elements of the vector sum to 1.

Then, the BOC representations corresponding to each region and each level are concatenated. This representation is referred to herein as a Spatial Pyramid BOC (SPBOC).

Figure 5:
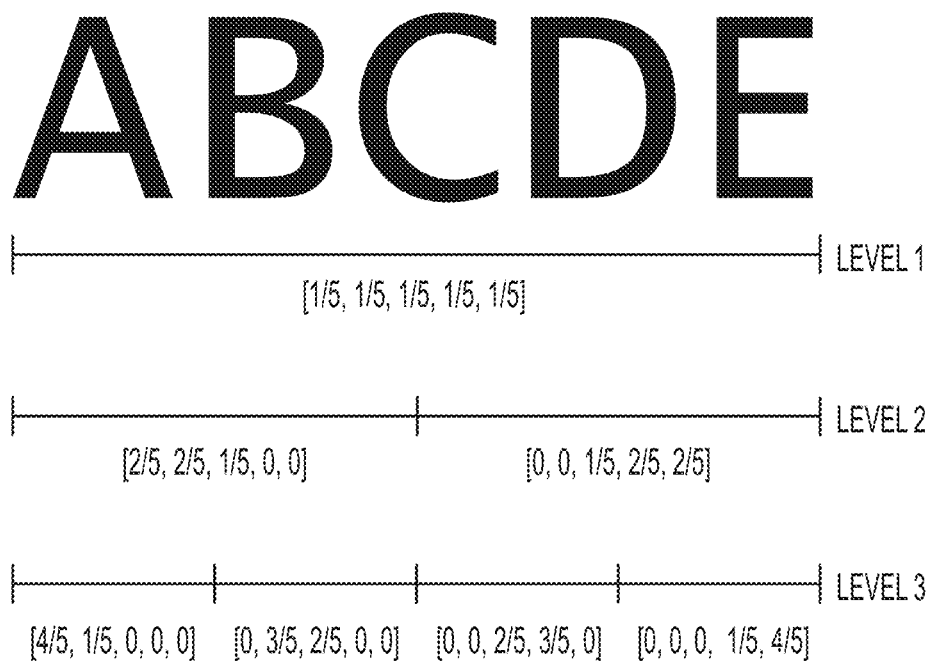
FIG. 5 illustrates an example of Spatial Pyramid Bag-of-Characters (SPBOC) Embedding.

FIG. 5 illustrates how this may proceed for the word ABCDE in the illustration. At the first level (where there is no partitioning), a normalized BOC for the partition is as for the BOC example above, i.e., the bag of characters includes an equal weight for each of characters ABODE. As for the BOC example, it is assumed, for ease of illustration, that the alphabet consists only of the letters A,B,C,D, and E. In practice, in the license plate example, a larger character set of, for example, 36 characters is considered, so the representations for each level would include elements which correspond to 0/36 where that character is absent from the character string 12. At the second level, where two regions are considered, the first region 72 encompasses letters A and B and half of letter C, which corresponds to [1/5,1/5,0.5/5,0/5,0/5] so the $l_1$ normalized BOC for this region is [2/5,2/5,1/5,0/5,0/5], i.e., $l_1$ normalization is such that all values in the representation of a region sum to 1. Going down to the next level, the first of four regions corresponds to letter A and ¼ of letter B, so the $l_1$ normalized BOC for this region is [4/5/,1/5,0/5,0/5,0/5]. The SPBOC is then generated by concatenating all of the normalized region BOCs for each of the levels, giving a 35 dimensional vectorial representation in this case. In this embodiment, each level is given the same weight. In other embodiments, the BOCs may be weighted or otherwise aggregated to generate the SPBOC.

The number of levels is not limited to the three illustrated and may be dependent on the expected number of characters in a word for example there may be at least 2 levels in one embodiment and at least 3 or at least 4 levels in another embodiment (the entire character string being the first level). In one embodiment, the number of regions in the lowest level is no greater than the average (or maximum) number of characters (including spaces in the character strings. In one embodiment, 5 levels may be employed, and this may generate up to 32×(1+2+4+8+16)=1,116-dimensional SPBOC representations, where 32 characters are considered. The histogram representations are $l_1$-normalized. An advantage of this representation is that it is typically sparse and therefore can be stored in an efficient manner.

While in the exemplary embodiment, at each level, the previous regions are each partitioned into two smaller regions, other partitioning methods could be employed, such as a SPBOC formed by partitioning one region into 3, 4 or more regions at the next level. Additionally, the partitioning could be different for different levels, for example to form level 3, level 1 could be partitioned into three regions. In each case, however, the partitioning results in a higher level (fewer regions) being partitioned to form a greater number of regions.

As will be appreciated, other techniques may be employed to embed ASCII words into a Euclidean space. As an example, an unsupervised learning method may be employed. Given a vocabulary Y, the similarity between two sequences of letters could be measured using the string kernel and kernel PCA could be employed for the actual embedding. See, for example, B. Schölkopf, A. Smola, and K.-R. Müller, "Non-linear component analysis as a kernel eigenvalue problem," Neural Computation, Jul. 1, 1998, Vol. 10, No. 5, pp. 1299-1319, for further details on kernel PCA. A potential disadvantage of this approach is that embedding a new unseen word (in the case where the vocabulary Y is to be enriched) is potentially costly. For example, using the Nyström approximation would require computing the string kernel between the new word and each element in Y (see, for example C. Williams and M. Seeger, "Using the Nyström method to speed up kernel machines," NIPS, 2001). In contrast, the exemplary SPBOC representation enables new words to be added easily and embedded on-the-fly.

Learning Objective Function

To learn the parameters w, of the embedding function a labeled training set is employed: S={$(x_n, y_n)$,n=1, . . . , N}, as described in FIG. 3. w can be a vector comprising a value for each pair of elements of the image and text representations, which can alternatively be expressed as a matrix W. For example a set 68 of N labeled training images is provided, such as license plate images, where N may be for example, at least 20 or at least 100. Each image may have been manually annotated with a label corresponding to the character string seen in the training image. Image representations are generated (S204) for these images. In structured learning, the goal is to minimize, with respect to the vector w, over all the training samples, an objective function of the form:

$$R(S; w) = \frac{1}{N} \sum_{n=1}^{N} \Delta(y_n, f(x_n)) + \frac{\lambda}{2} \|w\|^2. \quad (7)$$

Eqn. (7) expresses the fact that there is a distortion between the true label and the label predicted by the algorithm. The first term is an empirical loss where each term $\Delta(y_n, f(x_n))$ quantifies the loss of choosing the label $f(x_n)$ when the true label was $y_n$. The second term is a regularization term which penalizes larger values of w. The parameter $\lambda$, which may be determined through cross-validation, sets a balance between these two terms.

Different loss functions $\Delta$ may be used. The simplest one is the 0/1 loss: if the label is the correct one, the value for the term is 0 and if it is incorrect, the value of the term is greater than 0, e.g., 1, i.e. $\Delta(y_i, \hat{y}_i))=0$ if $y_i=\hat{y}_i$ and 1 otherwise. In another embodiment, if the SPBOC is $l_1$-normalized, then the label embeddings (text representations) can be viewed as multinomials, in which case, it make sense to use, as the loss $\Delta$, a distance between probability distributions. Common distances between distributions include the Hellinger distance, the $\chi^2$ distance, and the Manhattan distance. For two text representations that are E-dimensional multinomials a and b, then the loss term can be any one of, or a combination of:

$$\text{Hellinger}(a, b) = \sum_{e=1}^{E} \left(\sqrt{a_e} - \sqrt{b_e}\right)^2 \quad (8)$$

$$\chi^2(a, b) = 1 - 2\sum_{e=1}^{E} a_e b_e / (a_e + b_e) \quad (9)$$

$$\text{Manhattan}(a, b) = \sum_{e=1}^{E} |a_e - b_e|. \quad (10)$$

It may be noted that the Hellinger distance is simply the Euclidean distance on the square-rooted multinomials. In the example experiments below, the simple 0/1 loss was used to compute the loss term.

Since the objective function R (Eqn. 7) is difficult to optimize directly, one option is to optimize a convex surrogate instead. In structured support vector machines (SSVM), this can be achieved by choosing, as a convex upper-bound on $\Delta(y_n, f(x_n))$, the following loss which generalizes the hinge loss to multiple outputs:

$$B_1(y_n, f(x_n)) = \max_{y \in Y} \Delta(y_n, y) - F(x_n, y_n; w) + F(x_n, y; w). \quad (11)$$

This extension is generally referred to as the margin-rescaled hinge loss. An alternative upper-bound is the slack-rescaled hinge loss:

$$\max_{y \in Y} \Delta(y_n, y)(1 - F(x_n, y_n; w) + F(x_n, y; w)). \quad (12)$$

Note that in the 0/1 loss case, both Eqn. 11 and 12 are equivalent. See S. Nowozin and C. Lampert, "Structured learning and prediction in computer vision," Foundations and Trends in Computer Graphics and Vision, 2011. Vol. 6, Nos. 3-4, at p. 120.

A disadvantage of the upper-bound in Eqn. 11 is that it includes a $\max_y$ operation. This has two negative effects: i) the objective is typically non-smooth and ii) training can be slow when the cardinality of Y is large, even with techniques such as Stochastic Gradient Descent (SGD). See, Y. LeCun, L. Bottou, G. Orr, and K. Muller, "Efficient backprop," in G. Orr and M. K., Eds., Neural Networks: Tricks of the trade. Springer, 1998. Therefore, as an alternative, the method can resort to using convex upper-bounds which are not as tight but which are smoother. For example, the following upper bound is used:

$$B_2(y_n, f(x_n)) = \sum_{y \in Y} \Delta(y_n, y) - F(x_n, y_n; w) + F(x_n, y; w) \geq B_1(y_n, f(x_n)) \quad (13)$$

This is a further bound on Eqn. 11. The first term is the error $\Delta$ between the label and the true label for each sequence of characters $y_n$ from the set of possible sequences Y and can be the 0, 1 loss (0 if the same, 1 if different) or other computed loss. n goes over all training examples. The second term measures the similarity between image of nth example and the true label $y_n$ and the third term is the computed similarity between the image and a randomly sampled label y. The aim is to reward the cases when an image and its matching sequence give a higher similarity (under the current set of parameters w) than the image and a non-matching sequence.

This is similar to the ranking SVM proposed by Joachims (see, T. Joachims, "Optimizing search engines using click-through data," Proc. 8th ACM SIGKDD international conference on Knowledge discovery and data mining, pp. 133-142, 2002). Indeed, in the case of the 0/1 loss, $B_2$ can be shown to be an upper-bound on the rank of the correct label $y_n$. This formulation is referred to herein as Ranking Structured Support Vector Machine (RSSVM).

Optimization

In one embodiment, Stochastic Gradient Descent (SGD) is employed for optimization of the parameter of the embedding function. In the case of the formulation of the optimization in $B_1$, the aim is to seek $w^*$ such that:

$$w^* = \underset{w}{\operatorname{argmin}} \frac{1}{N} \sum_{n=1}^{N} B_1(x_n, f(y_n)) + \frac{\lambda}{2} \|w\|^2 \quad (14)$$

The learning procedure can be performed as follows.

At time t:

1. Randomly sample a pair comprising an image and its label $(x_n, y_n)$ from the training set.

2. Find the label from the set of labels which maximizes, over the set of labels the function:

$$\hat{y}_n = \underset{y \in Y}{\operatorname{argmax}} \Delta(y_n, y) - F(x_n, y; w).$$

3. Update the weights based on a step size and: $w \leftarrow (1-\eta_t\lambda)w + \eta_t[\psi(x_n, y_n) - \psi(x_n, \hat{y}_n)]$, where $\eta_t$ is the step size (learning rate) at time t. In what follows, $\eta_t = \eta$, i.e., the step size is fixed. In another embodiment, the step size decreases with time (number of samples), to decrease the amount of correction as the weights are progressively learned. A disadvantage of this algorithm is that it requires a max at step 2. As noted earlier, this can be very costly when the cardinality of $\psi$ is high.

In the case of $B_2$, the aim is to seek $w^*$ such that:

$$w^* = \underset{w}{\operatorname{argmin}} \frac{1}{N} \sum_{n=1}^{N} B_2(x_n, f(y_n)) + \frac{\lambda}{2} \|w\|^2 \quad (15)$$

The learning procedure can be as follows. At step t:

1. Randomly sample a training image and its label $(x_n, y_n)$.

2. Randomly sample a label from the set of labels which is not the correct label: $y \in Y - y_n$.

3. Update: $w \leftarrow (1-\eta_t\lambda)w + \eta_t[\psi(x_n, y_n) - \psi(x_n, y_n)]$ While optimizing this objective function requires a much larger number of iterations, each iteration is less costly and the whole convergence is typically much faster. In the exemplary embodiment, the formulation of Eqn. (15) is therefore optimized with this learning algorithm. The regularization parameter $\lambda$, in either case, can be 0 or greater, typically a small value, such as up to $10^{-5}$ or $10^{-7}$. In the Examples following $\lambda=0$ was found to work well.

For the initialization of weights w, the parameters of the matrix may be randomly sampled from a normal distribution, e.g., divided by the dimensionality of the image feature vectors.

Without intending to limit the scope of the exemplary embodiment, the following Examples demonstrate the applicability of the method to license plate recognition.

EXAMPLES

Figure 6:
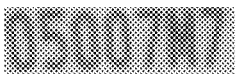
FIG. 6 shows examples of license plate images used in the Examples.

Experiments were conducted in the context of license plate recognition. A dataset of about 45,000 license plate images was obtained from toll booths. The images received were of segmented license plate regions, i.e., had been preprocessed to identify the text-region of a larger image. FIG. 6 shows several examples. The variability in numbering systems of the samples leads to a different number of characters and number/letter templates. This is partly because the US state where the images were taken maintains several types of plates. Additionally, some of the plates are from other states.

The dataset was split into a training set of about 34K plates corresponding to several days of data, and a test set of 11K, corresponding to a couple of subsequent days of data. Image features were extracted as Fisher vectors, as described above, and the SPBOC was computed for each existing label using 5 levels.

Example 1

License Plate Annotation

In this example, the aim was license plate annotation: given an image of a license plate, the goal is to compute the most compatible label from a list of labels (see Eqn. (1)). The system was trained as explained in the Optimization section with image/label pairs from the training set, and was evaluated on images from the test set, where the argmax of Eq. (2) goes over the set of unique 5K labels of the test set.

Figure 7:
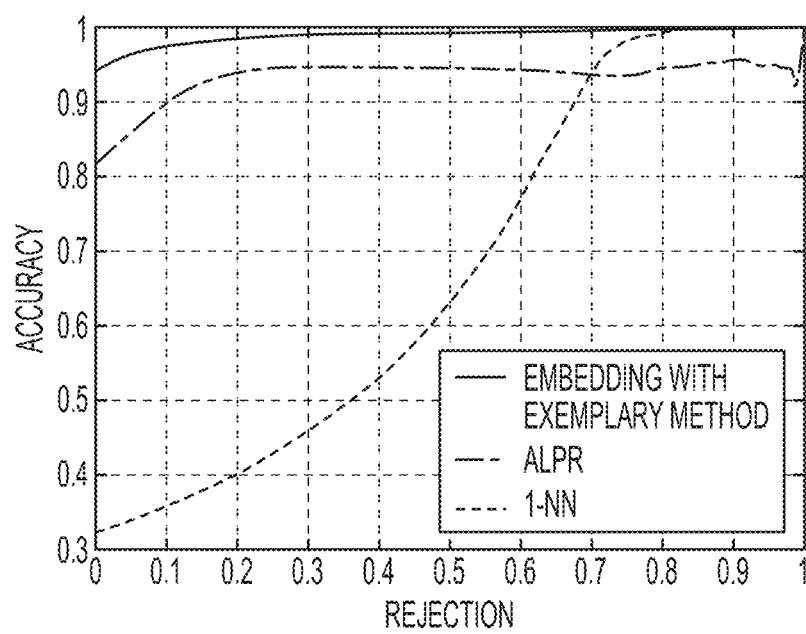
FIG. 7 is a plot of experimental results of an annotation experiment using the exemplary method using the whole test set.

The performance was measured in terms of top-1 accuracy by counting how many images are correctly matched with the true label (since the set of labels is known in advance for the test set). The value of the compatibility function F can be used as a confidence score to allow for a rejection mechanism. FIG. 7 shows the accuracy vs. reject characteristic of the proposed approach. The exemplary method was compared with two baselines: (i) a 1-nearest neighbor (1-NN) approach where for each test plate the label of the most similar training plate is output, and (ii) an existing commercial automated license plate recognition (ALPR) system used in some tolling installations.

Figure 8:
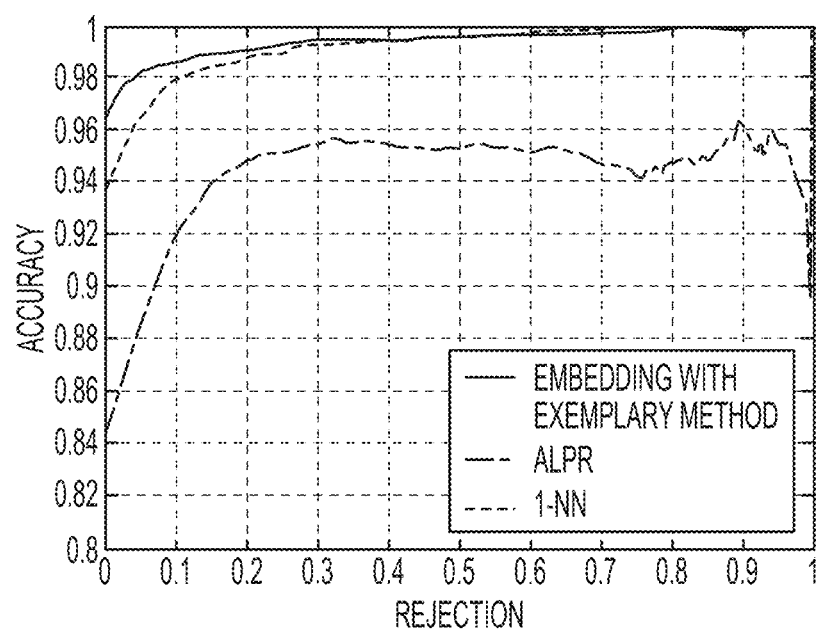
FIG. 8 is a plot of experimental results of an annotation experiment using the exemplary method using only the subset of images which have a true match in the database.

For completeness, the situation where test samples do always have a true match in the training set was evaluated. In this evaluation, only a subset of the test set was considered whose label set intersects with the labels present in the training set. Results are shown in FIG. 8. Two observations: can be made:

1. Comparison to 1-NN:

The 1-NN approach performs poorly and only reaches a high accuracy for a high rejection rate. This is likely due to the fact that only for about 18% of the test set, a plate with the same number exists in the training set. The 1-NN can only perform correctly for this 18% and should reject the 82% rest. This reflects the clear limitation of nearest-neighbor systems which cannot recognize identities not present in the training set. In contrast, the present system is able to correctly annotate images even if they belong to the previously unseen 82%. In practice, the accuracy of our method is already over 94% at a 0% reject rate.

In the case where test samples do always have a true match in the training set, the exemplary system obtains 96.2% accuracy (at 0% reject rate) vs. 93.3% for the 1-NN, and outperforms the 1-NN for reject rates up to 30% from where both methods perform on par.

2. Comparison to ALPR:

The exemplary system outperforms the commercial ALPR. With respect to ALPR, the present method has an advantage in that it selects a label from a list of about 5K unique plate numbers, while this list could not be provided to the ALPR system. On the other hand, the ALPR method has an advantage with respect to the present method in that it was fine-tuned to recognize plates of this particular US state, which can take several months to perform.

The exemplary method thus outperforms an ALPR system, given that a list of candidate labels is available. However, it may be noted that the method can handle relatively large lists of candidate images (of thousands of elements), and that in the field of OCR, especially for document text recognition, it is common practice to use lexicons of valid words. This is also the case in some ALPR applications, for example, recognition of pre-registered vehicles, or white/black lists.

Example 2

License Plate Retrieval

While the exemplary method can be used for annotation, it may be noted that the compatibility function F can also be used to perform retrieval/search: given a label, the goal is to find, in a dataset of images, a text image which matches the label.

The retrieval example is similar to the annotation example, but reversing labels and images at test time. In the example, the top-1 accuracy of retrieval is determined. For a baseline comparison, a system based on image retrieval is used: for each label, an image of that label is used as query and the most similar image is determined using the dot product between the respective Fisher vectors. A subset of the previous test set was used such that this is possible. The top-1 accuracy of the comparative image retrieval system is 93.3%, while accuracy with the present system is 96.1%. This demonstrates that the exemplary method is also a good method for retrieval.

In Eq. (5), it may be noted that $\theta(x)^T W$ is an embedding of the images x in the space of embedded labels. An evaluation was made as to whether $\theta(x)^T W$ is a better descriptor than $\theta(x)$ itself. This evaluation was performed by repeating the previous image based retrieval experiment using the dot product between the embedded image representations. By doing so, an increase from 93.3% to 96.1% was obtained (the same value as for label retrieval). Thus, even if the exemplary method is designed to match images with labels, it incidentally finds a good embedding of the images to perform improved image-to-image matching.

This is a major practical advantage of the exemplary method with respect to metric learning methods, which usually require pairs of relevant images to be trained. Sometimes, especially when there is a need for faster deployment, there may not be a large number of pairs of plate images to robustly learn a comparison metric. Using the exemplary method, which does not require pairs of images, only image/label pairs for the training set, would allow such a system to be developed more easily.

The exemplary system and method described herein employ several unique aspects, including: 1) text embedding in the context of text recognition, 2) the embedding being based on spatial pyramid bag-of-characters, 3) computing a direct similarity between the image representation and explicit label representation. However, it is to be appreciated that fewer than all of these aspects may be combined in a system and method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for comparing a text image and a character string comprising:

embedding a character string into a vectorial space, comprising extracting a set of features from the character string and generating a character string representation based on the extracted character string features;

embedding a text image into a vectorial space, comprising extracting a set of features from the text image and generating a text image representation based on the extracted text image features; and computing a compatibility between the text image representation and character string representation comprising computing a function of the text image representation and character string representation, the function including an embedding parameter w which is a DE-dimensional vector or a D×E matrix W which embeds the text image representation and character string representation into a new space, where D is the dimensionality of the text image representation and E is the dimensionality of the character string representation, wherein at least one of the embedding and the computing of the compatibility is performed with a processor.

2. The method of claim 1, wherein the function of the text image representation and character string representation is in a bilinear form.

3. A method for comparing a text image and a character string comprising:

embedding a character string into a vectorial space, comprising extracting a set of features from the character string and generating a character string representation based on the extracted character string features;

embedding a text image into a vectorial space, comprising extracting a set of features from the text image and generating a text image representation based on the extracted text image features; and computing a compatibility between the text image representation and character string representation comprising computing a function of the text image representation and character string representation, wherein the function is of the form:

$$F(x,y;W) = \theta(x)^T W \phi(y) \qquad (5)$$

where F represents the compatibility between an image and a character string, given a matrix of weights W, θ(x) represents one of the text image representation and the character string representation and φ(y) represents the other of the text image representation and the character string representation, and T represents the transpose operator, or where an approximation $W \approx U^T V$ is used, with $U \in \mathbb{R}^{R \times D}$, $V \in \mathbb{R}^{R \times E}$, where R<D, is a function of the form:

$$F(x,y;W) = (U\theta(x))^T (V\phi(y)) \qquad (6); \text{ and}$$

wherein at least one of the embedding and the computing of the compatibility is performed with a processor.

4. The method of claim 1, wherein the computing of the compatibility comprises determining whether the computed function meets a predetermined threshold.

5. The method of claim 1, wherein the character string comprises a sequence of characters, each character in the sequence being drawn from a finite set of characters.

6. The method of claim 1, wherein the character string is in a standard format selected from ASCII, UNICODE, and UTF-8 where each character of the character string is represented in the form of a binary code.

7. The method of claim 1, wherein the character string comprises a license plate number.

8. The method of claim 1, wherein the text image comprises a captured image of a license plate.

9. The method of claim 1, wherein the character string embedding comprises extraction of a spatial pyramid bag-of-characters.

10. A method for comparing a text image and a character string comprising:
embedding a character string into a vectorial space, comprising:
extracting a spatial pyramid bag-of-characters comprising partitioning the character string into a plurality of regions,
for each of the regions, extracting features based on the characters present in the region,
extracting a representation of each of the regions based on the respective extracted features, and
generating a character string representation, the character string representation being derived from the region representations;
embedding a text image into a vectorial space, comprising extracting a set of features from the text image and generating a text image representation based on the extracted text image features; and
computing a compatibility between the text image representation and character string representation comprising computing a function of the text image representation and character string representation,
wherein at least one of the embedding and the computing of the compatibility is performed with a processor.

11. The method of claim 10, wherein the partitioning of the character string into a plurality of regions and extracting a representation of each of the regions is repeated at least once, wherein in each of the repeats, the partitioning includes partitioning one of the previously-generated regions.

12. The method of claim 10, wherein the partition generates a spatial pyramid of regions which includes at least three levels, each of at least two of the levels including a plurality of the regions generated by partitioning the regions of a previous level in the spatial pyramid.

13. The method of claim 12, wherein the spatial pyramid includes at least seven regions.

14. The method of claim 1, wherein parameters of the compatibility function have been learned through optimization of a ranking objective function.

15. The method of claim 1, further comprising learning parameters of the compatibility function using a training set of text images that are each labeled with a respective character string corresponding to text present in the image.

16. The method of claim 1, wherein the text image embedding comprises extraction and aggregation of local descriptors using Fisher vectors in which a gradient of the log-likelihood of the descriptor is measured with respect to parameters of a Gaussian Mixture Model.

17. The method of claim 1, further comprising outputting information based on the computed compatibility between the text image representation and the character string representation.

18. The method of claim 1, wherein the character string comprises a vocabulary of character strings, and the method comprises outputting a character string from the vocabulary of character strings having a character string representation with a highest computed compatibility with the text image representation.

19. The method of claim 1, wherein the text image comprises a collection of text images and the method comprises outputting a text image from the collection of text images having a text image representation with a highest computed compatibility with the text image representation.

20. A computer program product comprising a non-transitory recording medium storing instructions, which when executed on a computer, causes the computer to perform the method of claim 1.

21. A system comprising memory which stores instructions for performing the method of claim 1 and a processor in communication with the memory for executing the instructions.

22. A system for comparing a text image and a character string comprising:
a text string representation generator for generating a character string representation based on features extracted from a character string, the character string consisting of a sequence of characters, the character string representation comprising a spatial pyramid bag of characters representation generated by partitioning the character string into at least two regions and partitioning each of the at least two regions into at least two smaller regions, the character string representation being based on representations of features extracted from the regions;
a text image representation generator for generating a text image representation based on features extracted from a text image;
a comparator for computing a compatibility between the text image representation and the character string representation;
an output component for outputting information based on the computed compatibility between at least one character string representation and at least one text image representation; and
a processor which implements the text string representation generator, text image representation generator; comparator, and output component.

23. A method for comparing a text image and a character string comprising:
for at least one character string comprising a sequence of characters, extracting a set of features from the character string, comprising partitioning the character string to form a spatial pyramid of regions, and for each region, generating a representation of the region comprising counting occurrences of each of a finite set of characters in the region and generating a region representation based on the counts;

generating a character string representation based on the region representations;

extracting a set of features from the text image and generating a text image representation based thereon; and computing a compatibility between the text image representation and the character string representation comprising embedding at least one of the character string representation and the text image representation with a matrix of learned parameters, the compatibility being a function of the at least one embedded representation, wherein at least one of the embedding and the computing of the compatibility is performed with a processor.

24. The method of claim 23, wherein in the partitioning, for at each of a plurality of levels of the spatial pyramid, regions of a previous level are each partitioned into at least two smaller regions.

* * * * *